United States Patent [19]
Taghezout

[11] Patent Number: 5,321,330
[45] Date of Patent: Jun. 14, 1994

[54] ELECTROMAGNETIC TRANSDUCER WITH A MULTIPOLAR PERMANENT MAGNET

[75] Inventor: Daho Taghezout, Lausanne, Switzerland

[73] Assignee: Eta SA Fabriques d'Ebauches, Granges, Switzerland

[21] Appl. No.: 989,582

[22] Filed: Dec. 11, 1992

[30] Foreign Application Priority Data

Dec. 17, 1991 [FR] France ................... 91 15767

[51] Int. Cl.⁵ ........................................... H02K 1/12
[52] U.S. Cl. .............................. 310/257; 310/40 MM
[58] Field of Search ............. 310/49 R, 257, 40 MM, 310/40.5, 36, 162, 163, 164, 213, 254, 156

[56] References Cited

U.S. PATENT DOCUMENTS

| | | | |
|---|---|---|---|
| 4,012,899 | 3/1977 | Matsuura | 310/40 MM |
| 4,206,375 | 6/1980 | Sudler | 310/49 R |
| 4,455,499 | 6/1984 | Sudler | 310/49 R |
| 4,629,924 | 12/1986 | Grosjean | 310/49 R |
| 4,680,494 | 7/1987 | Grosjean | 310/156 |
| 4,855,629 | 8/1989 | Sato | 310/49 R |

FOREIGN PATENT DOCUMENTS

| | | |
|---|---|---|
| 0151158 | 2/1985 | European Pat. Off. |
| 135055 | 3/1985 | European Pat. Off. |
| 8200929 | 3/1982 | PCT Int'l Appl. |

*Primary Examiner*—Steven L. Stephan
*Assistant Examiner*—E. To
*Attorney, Agent, or Firm*—Griffin Butler Whisenhunt & Kurtossy

[57] ABSTRACT

A reversible two-phase electromechanical transducer comprises a stator (2) extending primarily over three levels and a rotor (38) including a multipolar permanent magnet (48) located between first and second principal stator parts (4, 8). The first stator part defines a stator hole and first and second principal magnetic poles (80, 82) magnetically coupled to secondary magnetic poles formed by the castellations (70) of a circular gapped crown located on the edge of the stator hole. The second principal stator portion defines at least one third principal magnetic pole (90), such second principal stator portion being magnetically coupled to each of the first and second principal magnetic poles by means of respective first and second magnetic flux guidance legs (12, 13), each bearing an energization winding (28, 29).

17 Claims, 7 Drawing Sheets

ELECTROMAGNETIC TRANSDUCER WITH A MULTIPOLAR PERMANENT MAGNET

FIELD OF THE INVENTION

The present invention concerns an electromagnetic transducer with a multipolar permanent magnet. More specifically, the present invention concerns a two-phase transducer with a multipolar permanent magnet having N pairs of poles, N being an even number greater than 2, adapted to be used as a reversible electromechanical transducer.

The electromagnetic transducer of the present invention is capable of use as a motor in numerous applications, for example drives for discs, windings or cassettes in the informatic or audio-visual domains. One may also use such electromagnetic transducer for driving the hand of an analog indicator such as a speedometer in an automobile or an electronic watch.

BACKGROUND OF THE INVENTION

In the case of the electronic watch, there is generally employed an electromagnetic motor having a bipolar permanent magnet operating in a stepping mode, the rotor effecting a rotation through 180° for each step. If the watch includes a seconds hand for which stepping takes place at a frequency of 1 Hz, there is then required a reduction by a factor of 30 between the rotor of the motor and such hand. The rotation of the rotor through 180° per step and the gearing system serving for the reduction bring about energy losses basically due to friction and generate a relatively substantial noise.

Next, if one wishes to obtain an almost continuous displacement of the seconds hand with a bioplar permanent magnet, it is necessary to increase the operating frequency of the motor and consequently the reduction down between the rotor of such motor and the hand. This inevitably leads to additional energy losses and modifications of the timekeeping movement, especially insofar as these concern the dimensioning of the driving gears.

On the other hand, a multipolar motor showing a sufficient number of pole pairs enables reducing the energy losses, indeed the number of transmission gears and it renders possible an almost continuous displacement of the associated mechanism without thereby requiring a greater reduction than that which is necessary in the case of a motor with a bipolar permanent magnet, as mentioned hereinbefore.

It will also be observed that a motor with a multipolar permanent magnet may enable a lessening of the driving noise.

There is known in particular from European patent EP 0 151 158 a two-phase electromagnetic motor with an axially magnetized multipolar permanent magnet. The stator of this motor is basically formed from four principal stator parts and two magnetic flux guidance legs, each bearing a winding and each coupling two of such stator parts. The two stator parts coupled respectively to the first and to the second winding are profiled in a manner such that they fit into one another and that, when the first stator part is superposed on the south poles located on one of the two halves of the multipolar permanent magnet, the second stator part is superposed over the north poles of the same half of the multipolar permanent magnet.

The magnetization of the multipolar permanent magnet being axial, a disc of soft ferro-magnetic material serving as a magnetic flux guide is secured, in a first variant, on the face of the permanent magnet opposed to that located facing the stator parts. In a second variant, such disc is mounted in a manner such that the permanent magnet of the rotor is located between it and the general stator plane.

This motor exhibits the following disadvantages:
the two corresponding principal stator parts fitted into one another require a delicate adjustment. Additionally, they are not appropriate for a high number of poles. Next, a relatively substantial gap must be provided between such two parts located in a common plane in view of the magnetic potential difference between such two parts when the corresponding winding is energized.

In the first variant, the disc of soft ferromagnetic material secured on one of the faces of the permanent magnet of the rotor gives rise to magnetic short-circuits between the magnetic poles of the rotor permanent magnet. Additionally, the rotor permanent magnet being located in a plane other than the general stator plane, it is attracted by the stator itself. It is thus necessary to exert a force thereon in order to hold it in place, which causes friction lowering the yield of the motor. Finally, such disc increases the inertia of the rotor without increasing its useful volume.

In the second variant, the problem of positioning the rotor permanent magnet and the increase in inertia are partially resolved, but at the cost of an increase of magnetic reluctance. Effectively, the magnetic fluxes circulating in one of the motor magnetic circuits then traverse four gaps stator - permanent magnet of the rotor.

There is also known from Swiss patent CH 656 990 another two-phase electromagnetic motor having a multipolar permanent magnet.

The stator of this motor is primarily formed by a stator part defining a stator hole and four stator poles. Two adjacent stator poles are coupled to one another by a leg on which is assembled an energization winding. In the same manner, the two remaining poles are coupled to one another by a second leg bearing a second energization winding. The magnetization of the magnetic pole pairs of the rotor permanent magnet is axial.

The permanent magnet of the rotor is located in a neighbouring but different plane from the stator plane. In order to enable magnetic coupling between the stator poles and the permanent magnet, secondary stator poles are provided formed by teeth arranged over about a quarter of the circumference of the stator hole and directed towards the center thereof.

Each secondary pole belonging to a common principal pole is angularly separated from such principal pole by an even number of rotor poles relative to the other secondary poles of such principal pole and by an odd number of rotor poles relative to the secondary poles of the second principal pole energized by the same winding, whilst being angularly separated relative to the secondary poles of the other two principal poles magnetically coupled to the other winding by a whole number plus one half of rotor poles.

This special configuration of the secondary poles enables operation at 60 steps per revolution for a permanent magnet possessing thirty pairs of axially arranged poles by alternately energizing the two windings. Additionally, such a motor operates in the two possible rotation senses of the rotor.

However, this motor exhibits at least two major disadvantages. Initially, in order to permit the return of the magnetic flux, a disc of low magnetic reluctance is applied against the face of the permanent magnet which is opposed to the face located facing the stator. In the same manner as in the case of the first variant of the preceding motor, this plate brings about magnetic short circuits and thus increases the leakage fields of the rotor permanent magnet. Additionally, such plate increases the inertia of the rotor. Next, the rotor permanent magnet is also placed in a non-equilibrium position within the stator, that is to say, in a position not corresponding to the minimum energy of the stator - rotor system. Thus, the rotor magnet is attracted by the stator parts located in a plane neighbouring that of the permanent magnet. In order to maintain the magnet in its position, it is necessary to exert a mechanical sustaining force bringing about friction forces lowering the yield of such a motor.

Secondly, the two poles associated with the same winding must be magnetically insulated by a relatively large gap in view of the magnetic potential difference between such two poles when the associated winding is energized. This diminishes the possible utilization of the magnetized volume of the rotor permanent magnet.

The purpose of the present invention is to overcome the disadvantages described hereinabove in providing a two-phase multipolar electromagnetic transducer in which the position of the rotor permanent magnet corresponds substantially to a minimum energy position which is a balanced position of the latter within the stator, this motor further exhibiting a compact configuration, a very good yield and a relatively low manufacturing cost.

SUMMARY OF THE INVENTION

The present invention thus has as objective an electromagnetic transducer comprising:
- a stator comprising two magnetic flux guidance legs and a first principal stator part defining a first stator hole having a central region and a peripheral region surrounding said central region, the contour of said first stator hole defining within said peripheral region a first gapped circular crown located in a first stator plane and formed of castellations separated by slots; and
- a rotor having a rotation axis substantially perpendicular to said first stator plane and traversing said central region of said first stator hole, such rotor including an even number greater than two of bipolar permanent magnets each defining a pair of magnetic poles arranged on either side of a general rotor plane substantially perpendicular to said rotation axis so that the magnetic axis defined by each pair of magnetic poles has an orientation substantially parallel to said rotation axis and opposed to that of the magnetic axes defined by the adjacent pairs of magnetic poles, said pairs of magnetic poles being at least partially arranged facing at least a superposition portion of said castellations;
- first and second windings mounted respectively on said first and second magnetic flux guidance legs; such electromagnetic transducer being characterized in that said stator comprises a second principal stator part having a superposition portion arranged to face said pairs of magnetic poles and defining a second stator plane substantially parallel to said first stator plane, said superposition portions of said castellations and of said second principal stator part being respectively located on a first side and on a second side of said general stator plane, said first principal stator part defining first and second principal magnetic poles and said second principal stator part defining at least one third principal magnetic pole, said first and second magnetic flux guidance legs magnetically and respectively coupling said first and second principal magnetic poles with said second principal stator part.

In a first specific embodiment of the invention, the bipolar permanent magnets are to the number of N and form a multipolar permanent magnet having N identical annular sectors, each exhibiting a common central angle $\alpha$, a bipolar permanent magnet being located in each of such sectors.

In the present document, an annular sector refers to the surface bounded by two radii originating at a common point and by two circular arcs both centered on this point, the ends of the two circular arcs each being located on one of the two radii.

In this first specific embodiment of the invention, the first gapped circular crown is formed from first and second regularly gapped crowns, the castellations of such first and second regularly gapped crowns defining respectively first and second secondary magnetic poles. The castellations of the first and second regularly gapped crowns as well as the slots between the castellations of a common regularly gapped crown each define an annular sector having an angle $\alpha$ at the center thereof identical to the angle $\alpha$ at the center of said annular sectors of the multipolar permanent magnet of the rotor.

The first and second regularly gapped crowns are respectively separated from one another by two intermediate slots defining an angle at the center, the value of which is equal to said central angle multiplied by a whole number plus or minus $\alpha/2$. Thus, when the first regularly gapped crown has each of its castellations exactly superposed onto one pair of magnetic poles of the multipolar permanent magnet of the rotor, each of the castellations of the second regularly gapped crown is likewise superposed onto two pairs of adjacent magnetic poles of such multipolar permanent magnet. The first and second regularly gapped crowns are magnetically insulated from one another by an isthmus or gap located in the region of each of the two intermediate slots.

Continuing in this first embodiment, the second stator part is formed by an annular portion and a body coupled thereto by a neck, the body comprising two magnetic contact lugs. In the region neighbouring the external edge of the annular portion, there is provided a second gapped circular crown, the castellations and slots of which are arranged in an identical manner to the first gapped circular crown of the first principal stator part, the castellations of such latter being basically superposed onto the castellations of the second gapped circular crown. The first stator part is planar and located entirely against the first stator plane, while the second principal stator part is also planar and located entirely against the second stator plane.

In another specific embodiment of the invention, the second gapped circular crown of the second principal stator part superposed onto the first gapped circular crown of the first principal stator part is located on the internal edge of the annular portion, the castellations of such second gapped circular crown in this case having a thickness greater than the thickness of the ring in order to force the magnetic flux created by the windings to close in upon itself through the multipolar permanent magnet of the rotor.

In both specific embodiments of the invention described hereinbefore, the castellations of the second gapped circular crown of the second principal stator part form third secondary magnetic poles, magnetically coupled to the third principal magnetic pole. However, in another embodiment of the invention, the second principal stator part does not include a gapped circular crown defining third secondary magnetic poles; only a magnetic flux collector ring or disc is provided.

Finally, in another embodiment of the invention, the second principal stator part defines two principal magnetic poles, each of such two principal magnetic poles corresponding to a principal magnetic pole of the first principal stator part, the two resulting magnetic circuits of such electromagnetic transducer being then entirely magnetically uncoupled.

There results from such characteristics an electromagnetic transducer the rotor multipolar permanent magnet of which is placed substantially in a minimum magnetic energy position relative to the stator, that is to say, in a balanced position. Thereupon, the yield of such transducer is raised, being given that the magnetic circuits of the transducer traverse the rotor multipolar permanent magnet once only in an axial manner, thus limiting the gap in each magnetic circuit of such electromagnetic transducer, while assuring an optimum utilization of the magnetized volume of the rotor permanent magnet.

In the case of embodiments in which the second principal stator part comprises a second gapped circular crown superposed onto the first gapped circular crown of the first stator part, the yield of the electromagnetic transducer according to the invention is further improved since the leakage fields of the rotor multipolar permanent magnet are extremely small.

Other characteristics of the invention will better appear upon reading the following detailed description made with reference to the attached drawings which are given solely by way of example.

DESCRIPTION OF THE PREFERRED EMBODIMENTS

Figure 1:
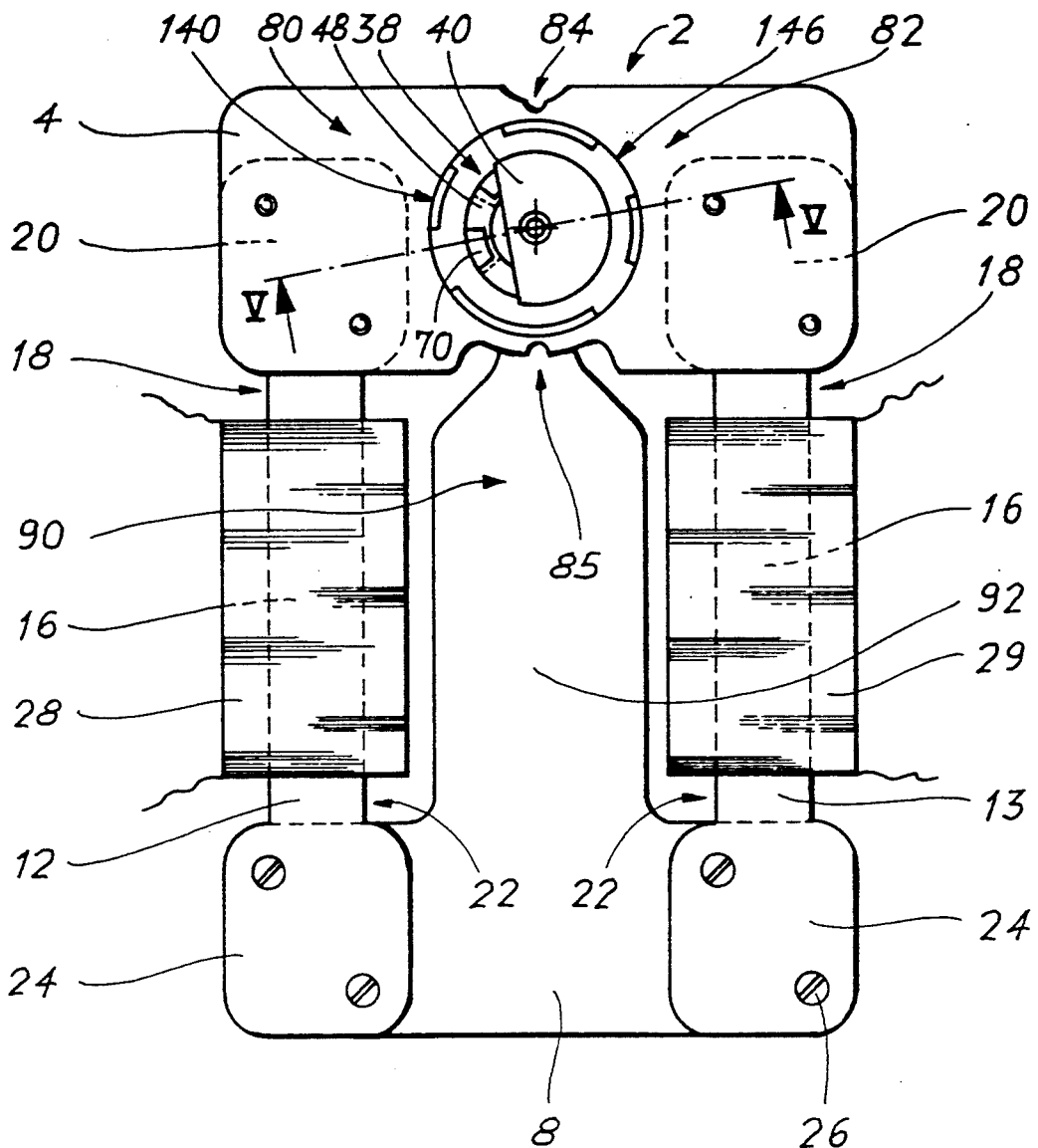
FIG. 1 is a plan view of a first embodiment of an electromagnetic transducer according to the invention.
Figure 2:
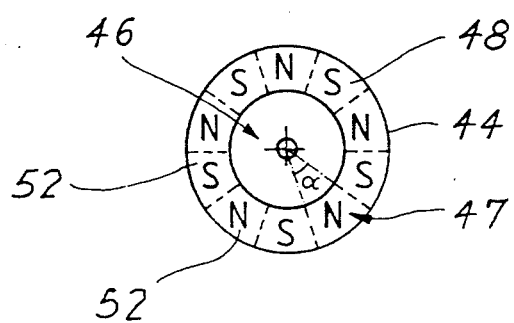
FIG. 2 shows the multipolar permanent magnet of the rotor of FIG. 1.
Figure 3:
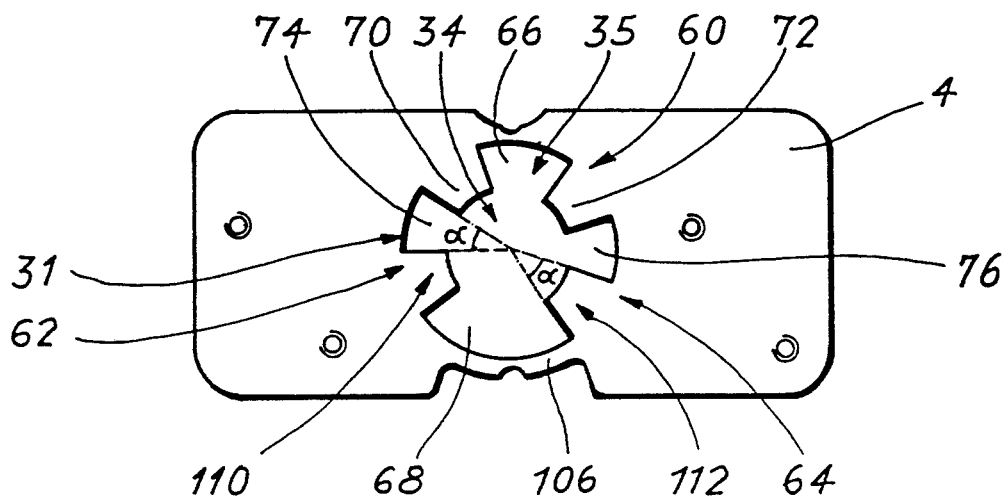
FIGS. 3 and 4 respectively show the first and second principal stator parts of the electromagnetic transducer of FIG. 1.
Figure 4:
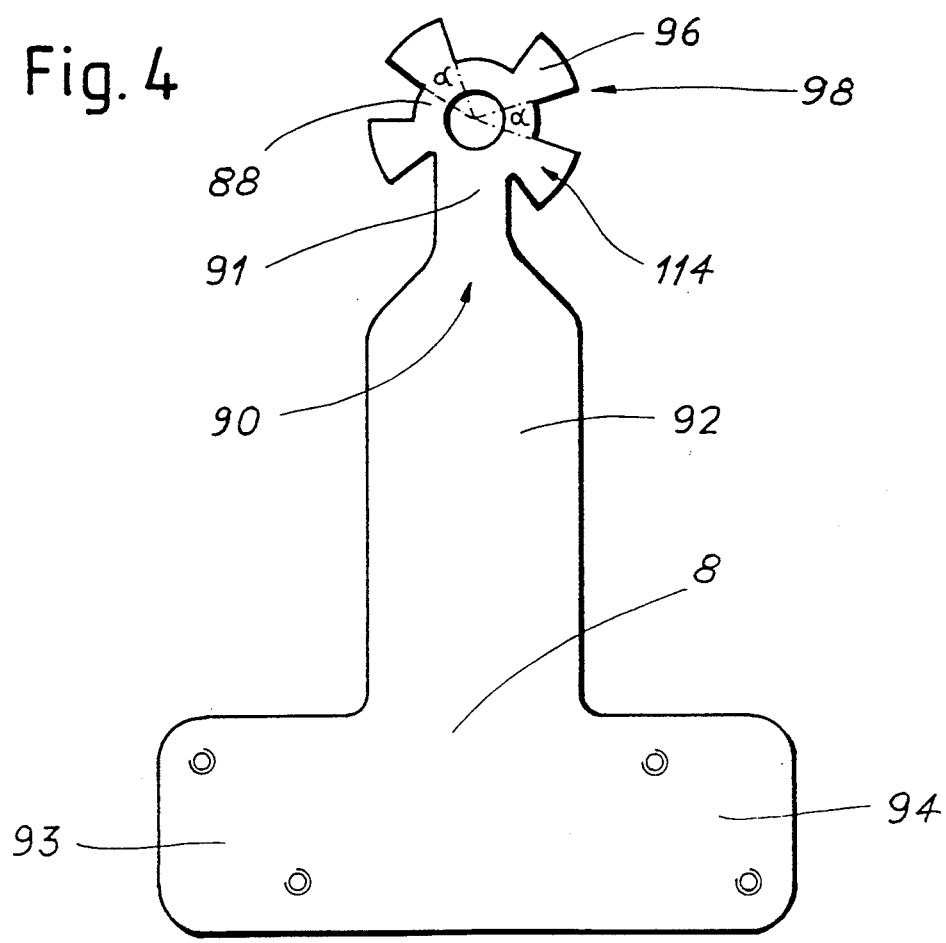
Figure 5:
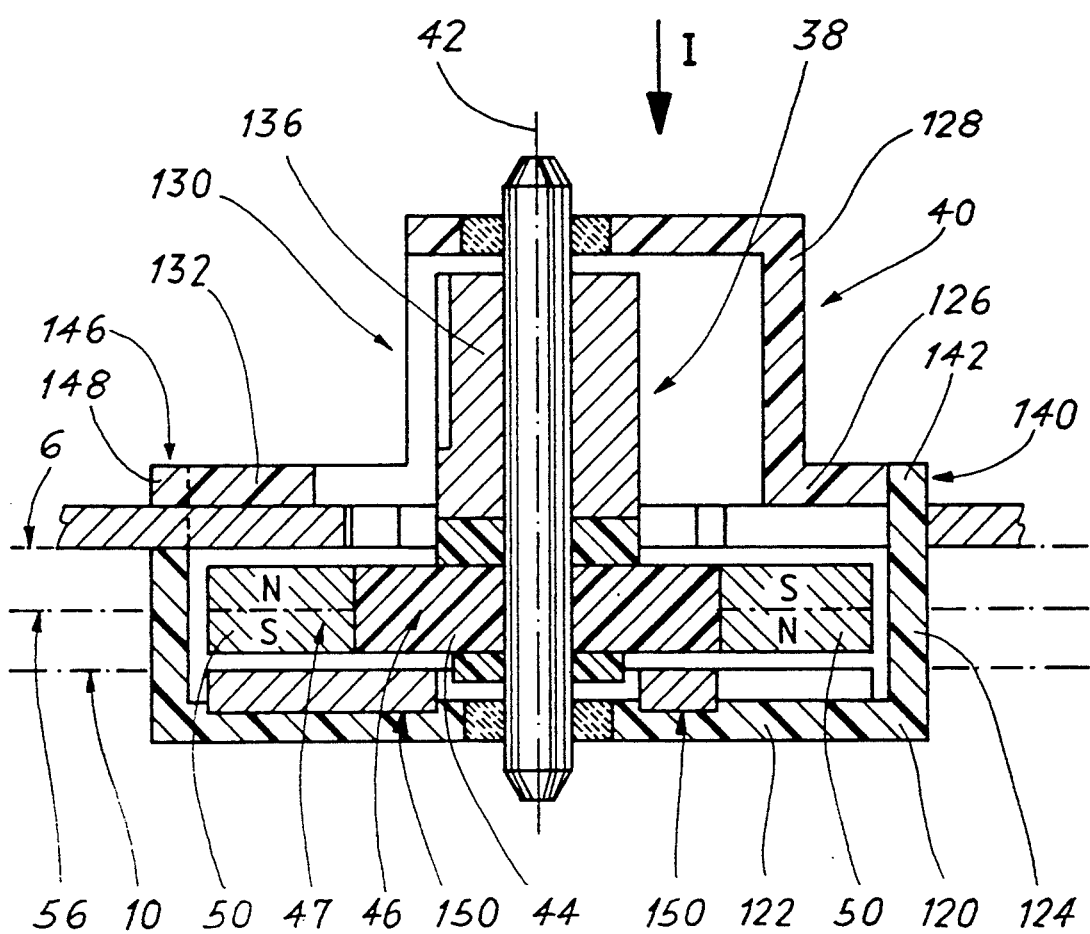
FIG. 5 is a cross-section along the section line V—V of FIG. 1.

In referring to FIGS. 1 to 5, there will hereinafter be described a first embodiment of an electromagnetic transducer according to the invention.

Such electromagnetic transducer comprises a stator 2 including a first planar principal stator part 4 located against a first stator plane 6 and a second planar principal stator part 8 located against a second stator plane 10 parallel to the first plane 6. Such first and second principal stator parts 4 and 8 are magnetically coupled to one another through first and second magnetic flux guidance legs 12 and 13, each of such legs comprising a core 16 the respective first and second ends 18 and 22 of which are terminated by respective first and second magnetic contact lugs 20, 24.

The respective first and second magnetic contact lugs 20, 24 are magnetically coupled to the respective first and second principal stator parts 4, 8 by means of securing screws 26, any other securing means being naturally foreseeable. On each of the two cores 16 are mounted respective first and second windings 28 and 29, such two windings being coupled to an electric energization source comprising an appropriate control system for the motor (not shown).

The first principal stator part 4 defines a first stator hole 31. The first stator hole 31 comprises a central region 34 of circular form and a peripheral region 35 of annular form. A rotor 38 is mounted in a cage 40 in a manner such that the rotational axis 42 of rotor 38 is perpendicular to the first and second stator planes 6, 10 and passes through the center of the central circular region 34 of the first stator hole 31.

Rotor 38 includes a disc 44 comprising a non-magnetic central portion 46 of circular form and an annular peripheral portion 47 comprising a multipolar permanent magnet 48 including ten permanent bipolar magnets 50 defining ten pairs of magnetic poles. It will be noted that the non-magnetic central portion 46 is not absolutely necessary and the magnet could be extended to the center of the disc. The pairs of magnetic poles are axially oriented, that is to say, along a direction parallel to the rotation axis 42 of rotor 38. The number of pairs of poles chosen for this embodiment of an electromagnetic transducer according to the invention is given solely by way of example. Effectively, the electromagnetic transducer according to the invention comprises an even number N of bipolar permanent magnets, N being greater than 2.

The bipolar permanent magnets 50 are arranged in a regular manner in the annular peripheral portion 47 of disc 44 such that each of such bipolar permanent magnets defines an annular sector 52, the angle α at the center of which has an identical value for each of the angular sectors 52.

In the present document, annular sector will refer to the surface bounded by two radii originating from a single point and by two circular arcs, both centered on such point, the ends of the two circular arcs being each located on one of the two radii. In the example described here, the angle α at the center has the value of 36°.

The disc 44 of rotor 38 is perpendicular to the rotation axis 42 of such rotor and located in a general rotor plane 56 between the first and second stator planes 6 and 10.

The contour of the first stator hole 31 effected in the first principal stator part 4 defines a first gapped circular crown 60 located in the peripheral region 35 of such first stator hole 31. Such first gapped circular crown 60 is formed by first and second regularly gapped crowns 62, 64 separated from one another by first and second intermediate slots 66, 68. The first and second regularly gapped circular crowns 62, 64 each are formed by an alternation of castellations 70, 72 and slots 74, 76 located between two adjacent castellations of a common regularly gapped crown.

The first principal stator part 4 of stator 2 defines first and second principal magnetic poles 80, 82 magnetically insulated from one another by means of first and second magnetic insulation isthmuses 84, 85. The first isthmus 84 and the second isthmus 85 are respectively located in the region neighbouring the first and second intermediate slots 66, 68 of the peripheral region 35 of the first stator hole 31.

The first magnetic contact lugs 20 of the first and second magnetic flux guidance legs 12, 13 are magnetically and respectively coupled to the first and second principal magnetic poles 80, 82.

The second principal stator part 8 comprises an annular portion 88 belonging to a third principal magnetic pole 90. Such second principal stator part 8 further comprises a body 92 coupled to the annular portion 88 by means of a neck 91, such body 92 being terminated by two magnetic contact lugs 93 and 94. Castellations 96 projecting from the outer edge of the annular portion 88 form a second gapped circular crown 98 basically superposed onto the first gapped circular crown 60 of the first principal stator part 4.

Each of the castellations 96 of the second gapped circular crown 98 defines an annular sector the angle $\alpha$ at the center of which is identical with the angle at the center of castellations 70, 72 of the first gapped circular crown 60. The second gapped circular crown 98 comprises a number of castellations 96 identical to the number of castellations 70 and 72 of the first gapped circular crown 60, each of such castellations of the second gapped circular crown 98 having an orientation identical to one of castellations 70, 72 of the first gapped circular crown 60. The peripheral annular portion 47 of disc 44 of rotor 38 is basically superimposed onto the peripheral region 35 of the first stator hole 31 in which is located the first gapped circular crown 60.

In order to force the magnetic flux produced by one or the other of the two windings 28 or 29 to pass through the magnetic pole pairs 50 of rotor 38, it is provided that the superpositional region between the first and second principal stator parts 4 and 8 is basically defined by the castellations 70, 72 and 96 of the respective first and second gapped circular crowns 60, 98.

In order to arrange this, neck 91 of the second stator part 8 coupling the annular portion 88 to body 92 is the only part outside castellations 96 of such second principal stator part 8 to be partially superposed onto the first principal stator part 4. The superpositional region between neck 91 of the second principal stator part 8 and the first principal stator part 4 is minimized by the fact that neck 91 is superposed onto the first principal stator part 4 in the region of the second magnetic insulation isthmus 85 which is located in the central region of a narrow band 106. Thus, the quantity of magnetic flux able to pass directly from the principal stator part 4 to the second principal stator part 8 without traversing multipolar permanent magnet 48 of rotor 38 is negligible.

In order to eliminate any superpositional region other than the castellations 70, 72 of the first principal stator part 4 between the first and the second principal stator part, it is possible to provide a gap in the place of the second magnetic insulation isthmus 85 and the narrow band 106 as is the case in the second embodiment of the invention described in connection with FIG. 6. It will also be noted that the first magnetic insulation isthmus 84 may be replaced by a gap in another variant of this embodiment.

The electromagnetic transducer described hereinbefore has two principal magnetic circuits. The first and second principal magnetic circuits are respectively formed by first and second magnetic flux guidance legs, the first and second principal magnetic poles 80, 82, the first and second regularly gapped crowns 62, 64 as well as by one half of the multipolar permanent magnet 48 of rotor 38, the second gapped circular crown 98 and finally the third principal magnetic pole 90. Thus, castellations 70, 72 of the first and second regularly gapped crowns 62, 64 respectively form first and second secondary magnetic poles 110, 112. In the same manner, castellations 96 of the second gapped circular crown 98 of the second principal stator part 8 form third secondary magnetic poles 114.

In the electromagnetic transducer described hereinbefore, it will be noted that the angular separation between two castellations 70, 72 of the respective first and second regularly gapped crowns 62, 64 is equal to twice the value of angle $\alpha$ while the angular separation between a castellation 70 of the first regularly gapped crown 62 and a castellation 72 of the second regularly gapped crown 64 is equal to an integer times angle $\alpha$ plus $\alpha/2$. Thus, when a castellation 70 of the first regularly gapped crown 62 is superposed over a north pole facing it, all the other castellations of this first regularly gapped crown are also superposed onto north poles of the multipolar permanent magnet 48 facing them, while each of the castellations 72 of the second regularly gapped crown 64 is superposed equally over a north pole and a south pole of the multipolar permanent magnet 48 facing it.

A possible operation of the electromagnetic transducer described hereinabove is as follows: the first winding 28 is energized alternately with the second winding 29. When a winding 28, 29 is energized, the multipolar permanent magnet 48 of rotor 38 will align the pole pairs 50 with the castellations of the principal magnetic circuit to which such winding belongs. Thus, in a stepping mode of operation of such electromagnetic transducer, the rotor effects a rotation through an angle $\alpha/2$ at each step. In the case of the multipolar magnet 48 having ten magnetic pole pairs 50, rotor 38 effects one revolution every 20 steps.

In the embodiment of the invention described hereinabove, cage 40 in which rotor 38 is mounted is given solely by way of example. The cage 40 of rotor 38 comprises a first part 120 formed by a bottom 122 of circular form and a lateral wall 124, such cage 40 further comprising a second part 126 including a hollow blind cylinder 128 exhibiting an opening 130 in its lateral surface and an end flange 132. Opening 130 is provided in order to permit a gear to mesh with the mechanical force transmission pinion 136.

The first part 120 of cage 40 of the rotor comprises on its lateral surface on the side of the free end a gapped crown 140 the castellations 142 of which correspond to slots 74, 76 of the gapped circular crown 60 and to the two intermediate slots 66 and 68. A slot is provided in the castellation corresponding to the intermediate slot 68 for neck 91 of the second principal stator part 8, such slot being deeper than the other slots of the gapped crown 140 of such first part 120 of cage 40 which have a depth corresponding to the thickness of the first principal stator part 4 to which is added the thickness of the end flange 132. The end flange 132 of the second part 126 of the rotor cage itself is terminated by a gapped crown 146 complementary to gapped crown 140 of the first part 120 of the rotor cage, the castellations 148 of the gapped crown 146 of end flange 132 corresponding to the slots of gapped crown 140 of the first part 120 of the rotor cage in a manner such that castellations 142 and 148 may be fitted into one another. It will be further noted that an impression 150 is provided in the bottom 122 of the first part 120 of the rotor cage, such impression corresponding to the contour of the second principal stator part which is superposed onto bottom 122 of such first part 120 of the rotor cage.

Figure 6:
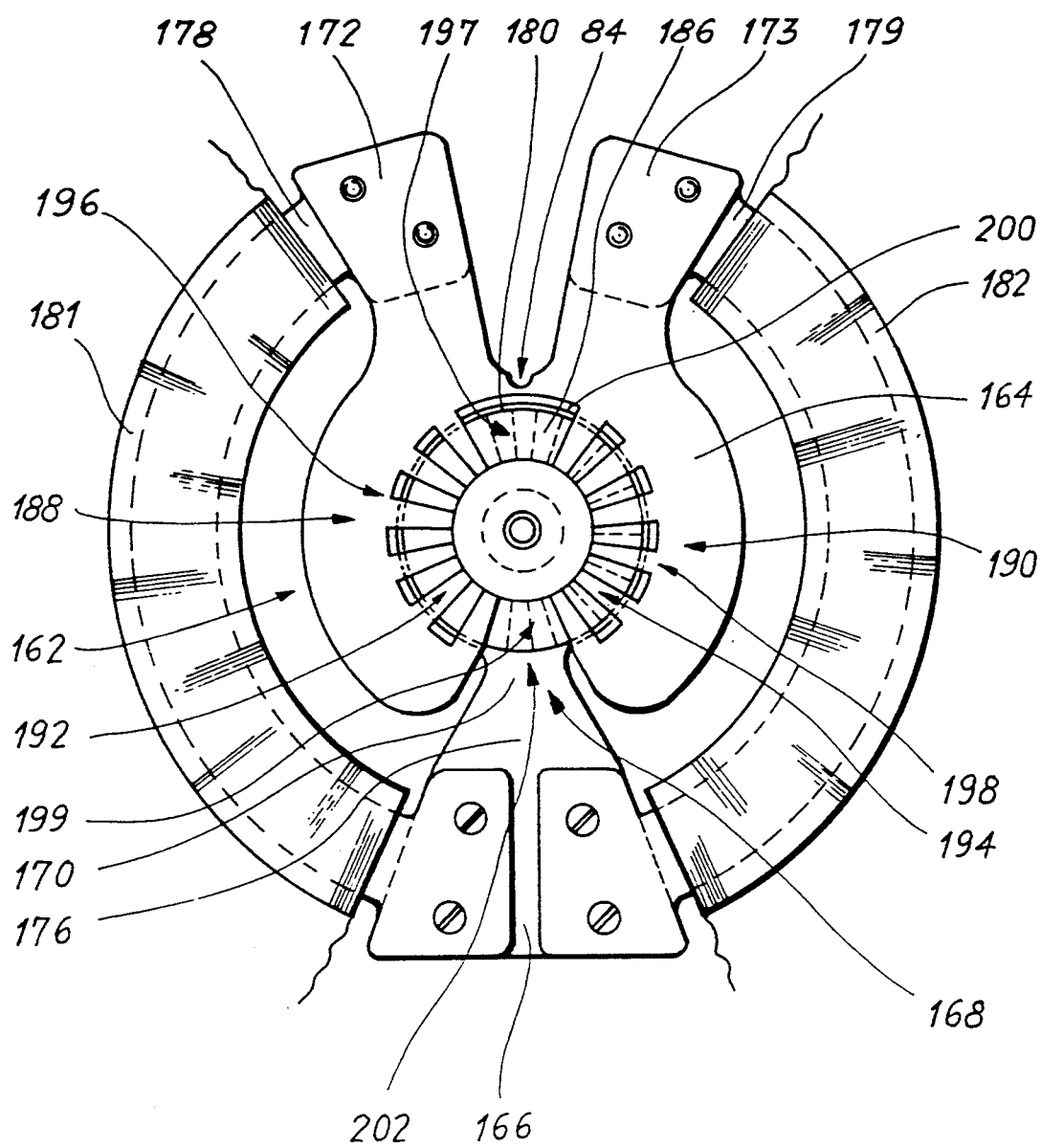
FIGS. 6 and 7 show respectively second and third embodiments of an electromagnetic transducer according to the invention.

Referring now to FIG. 6, there will be described hereinafter a second embodiment of an electromagnetic transducer according to the invention.

The stator 162 of this electromagnetic transducer comprises first and second principal stator parts 164, 166. The first principal stator part 164 is primarily distinguished from the first embodiment described in FIGS. 1 to 5, initially by the fact that the narrow band 106 and the magnetic insulation isthmus 85 of the first embodiment are replaced by a gap 168 sufficiently wide so as to enable the neck 170 of the second principal stator part 166 to exhibit no superposition surface with the first principal stator part 164. Secondly, such first principal stator part 162 is characterized by the fact that its two magnetic contact lugs 172, 173 are located in a region which neighbours and opposes the region in which is located body 176 of the second principal stator part 168 relative to the multipolar permanent magnet 180 of the rotor (for reasons of clearness of the drawing only the multipolar permanent magnet of the rotor has been drawn on FIG. 6).

The two principal stator parts 164 and 166 are coupled to one another by means of legs 178, 179 in the form of an arc of a circle. This special configuration of stator 162 gives the electromagnetic transducer a compact form with a relatively high length of windings 181, 182. In addition, this configuration of stator 162 is particularly appropriate for a rotor comprising a relatively large multi-polar permanent magnet 180 as is the case here. The multi-polar permanent magnet 180 in this second embodiment includes thirty pairs of axially oriented poles 186, each of such pole pairs 186 defining an identical annular sector.

Again, the first stator part 162 defines first and second principal magnetic poles 188, 190 coupled magnetically and respectively to first and second secondary magnetic poles 192, 194 respectively defined by the castellations of first and second regularly gapped crowns 196, 198, such first and second regularly gapped crowns being separated from one another by first and second intermediate slots 197, 199. As in the first variant, each of the castellations of these two regularly gapped crowns defines an annular sector the angle at the center of which is identical to the angle at the center defined by annular sectors in which are located pole pairs 186 of the multipolar permanent magnet 180. The slots separating the castellations of each of these two regularly gapped crowns 196 and 198 also define annular sectors the angle at the center of which is identical to the angle at the center defined by the castellations of these first and second regularly gapped crowns 196, 198.

The second principal stator part 166 is formed by a body 176 and by a ring 200 joined together by a neck 170 forming a third principal magnetic pole 202. Ring 200 has an outer diameter substantially identical to the diameter of the multipolar permanent magnet 180, the interior opening of such ring 200 serving at least to pass the rotor shaft of such electromagnetic transducer.

As in the first embodiment of the invention, the respective first and second principal stator parts 164, 166 and the multipolar permanent magnet of the rotor have a planar structure and define three neighbouring and parallel planes, the plane of the multipolar permanent magnet 180 being between the two other planes.

Figure 7:
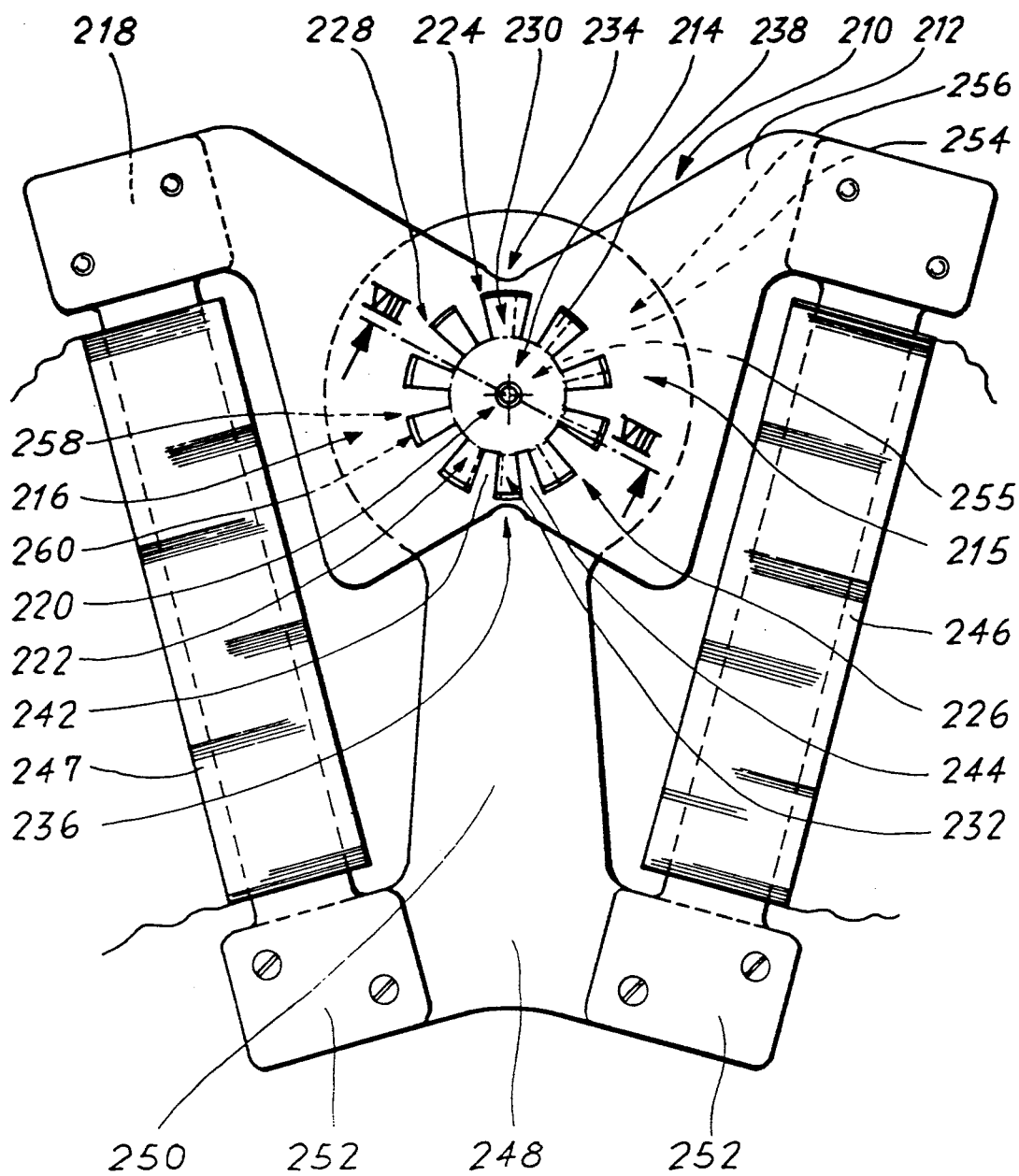
Figure 8:
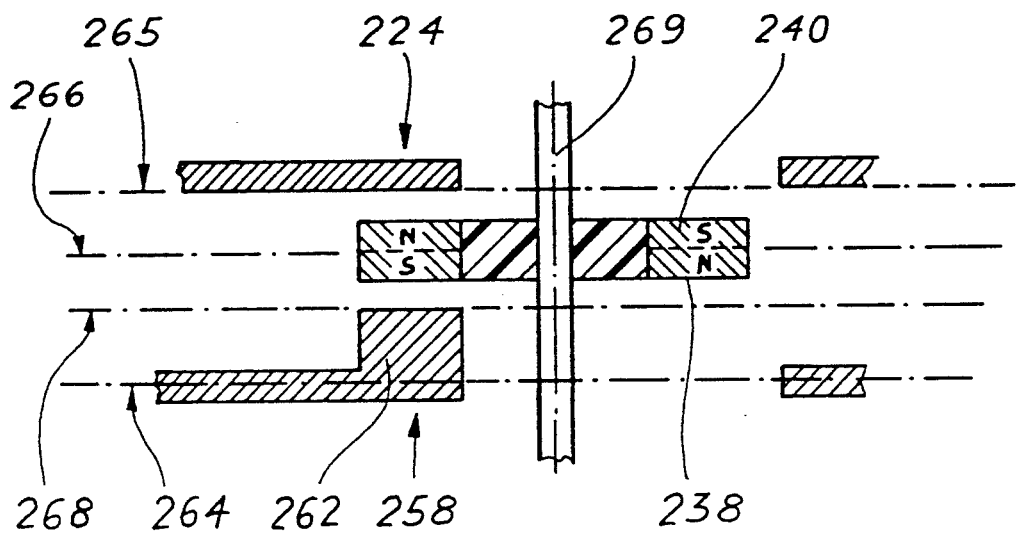
FIGS. 8 and 10 are cross-section views respectively according to the section lines VIII—VIII and X—X of FIGS. 7 and 9.

Referring now to FIGS. 7 and 8, there will be described hereinafter a third embodiment of an electromagnetic transducer according to the invention.

This electromagnetic transducer comprises a stator 210 comprising a first stator part 212 defining a first stator hole 214 and first and second principal magnetic poles 215, 216, each of such two principal magnetic poles having the form of a butterfly wing terminated by a magnetic contact lug 218. Entirely as in the two embodiments of the invention described hereinbefore, the first stator hole 214 comprises a central region 220 and a peripheral region 222 in which the contour of the first stator hole 214 defines a first gapped circular crown 224. Such first gapped circular crown 224 is again formed by first and second regularly gapped crowns 226, 228, such two regularly gapped crowns being separated from one another by first and second intermediate slots 230, 232.

First and second isthmuses 234, 236 serving to insulate magnetically the first and second principal magnetic poles 215 and 216 are respectively provided in the regions neighbouring the first and second intermediate slots 230, 232. It will be noted that the structure of the first stator part 212 is substantially similar in the region neighbouring the first intermediate slot 230 and in the region neighbouring the second intermediate slot 232.

Given that the multipolar permanent magnet 238 comprises twenty pairs of axially oriented magnetic poles 240, the castellations of the first and second regularly gapped crowns 226, 228 define an angle at the center of 18°. In order best to utilize the useful volume of the multipolar permanent magnet 238, the two castellations 242 and 244 defining the second intermediate slot 232 are of reduced dimension in a manner such that the second intermediate slot 232 is, together with the second isthmus 236, sufficient for insulating the first and second principal magnetic poles 215 and 216. The two castellations 242 and 244 thus define an angle at the center smaller than the angle at the center defined by the other castellations. In the example given in FIG. 7, the two castellations 242 and 244 define an angle at the center of about 14°. This special structure of the first gapped circular crown 224 enables having a maximum number of castellations defining secondary magnetic poles through which passes the mutual coupling flux of the multipolar permanent magnet 238 and windings 246, 247. Such a structure thus enables to achieve a maximum magnetic coupling between the multipolar permanent magnet and the winding.

Such electromagnetic transducer also comprises a second principal stator part 248 comprising a central body 250 terminated at one end by two magnetic contact lugs 252 and at the other end by a magnetic flux collector ring 254 defining a second stator hole 255. Such ring 254 defines a third principal magnetic pole 256. A second gapped circular crown 258 is provided in the annular region neighbouring the internal edge 260 of the magnetic flux collector ring 254. The castellations of such second gapped circular crown 258 define third secondary magnetic poles. The projection of the second gapped circular crown 258 on the general plane 264 of the second principal stator part is identical to the projection of the first gapped circular crown 224 onto the first stator plane 265 of the first principal stator part. However, given that the first and second principal stator parts 212 and 248 possess a relatively large superposition surface other than the surface of the castellations of the first and second gapped circular crowns 224, 258, the thickness of the greater part of castellations 262 of the second gapped circular crown 258 is greater than the thickness of the magnetic flux collector ring 254. The greater part of castellations 262 projects out of the general plane 264 in which is basically comprised the second principal stator part 248 in the direction of the general rotor plane 266 in which is located the multipolar permanent magnet 238 of this electromagnetic transducer, parallel to the general plane 265, the end of such castellations 262 defining a second stator plane 268 parallel to the plane 266 of the multipolar permanent magnet 238.

It will be noted that for reasons of clarity only the multipolar permanent magnet 238 and an axis of rotor 269 have been shown on FIGS. 7 and 8.

It will also be noted that a compact structure similar to that of the second embodiment of the invention described hereinbefore is obtainable without more in a variant of this third embodiment of an electromagnetic transducer according to the invention. Additionally, in another embodiment of the invention, it is provided that the magnetic flux collector ring does not include a gapped circular crown, such ring being then partially superposed with the multipolar permanent magnet 238.

Figure 10:
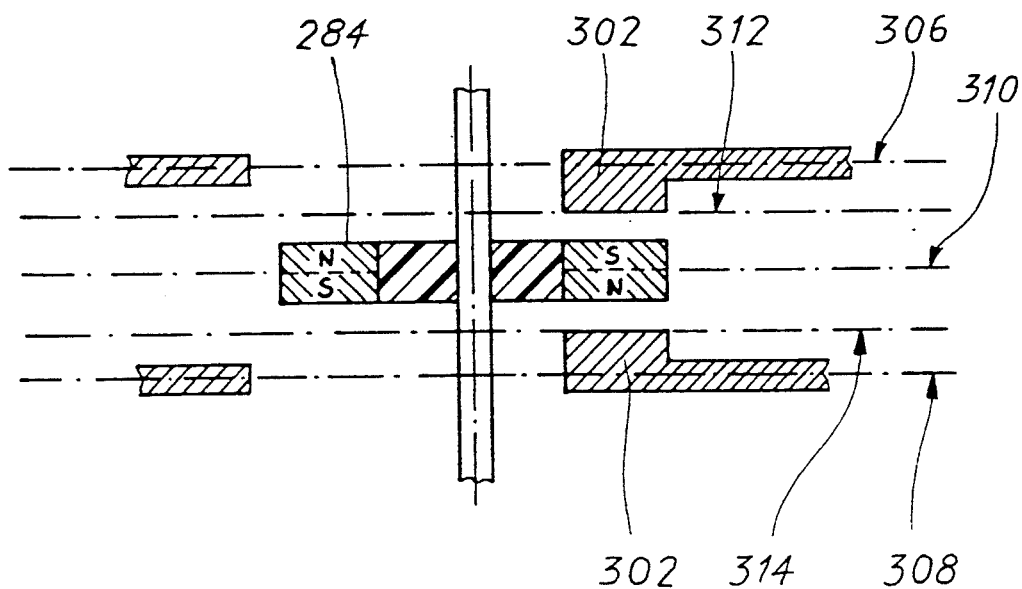
Figure 9:
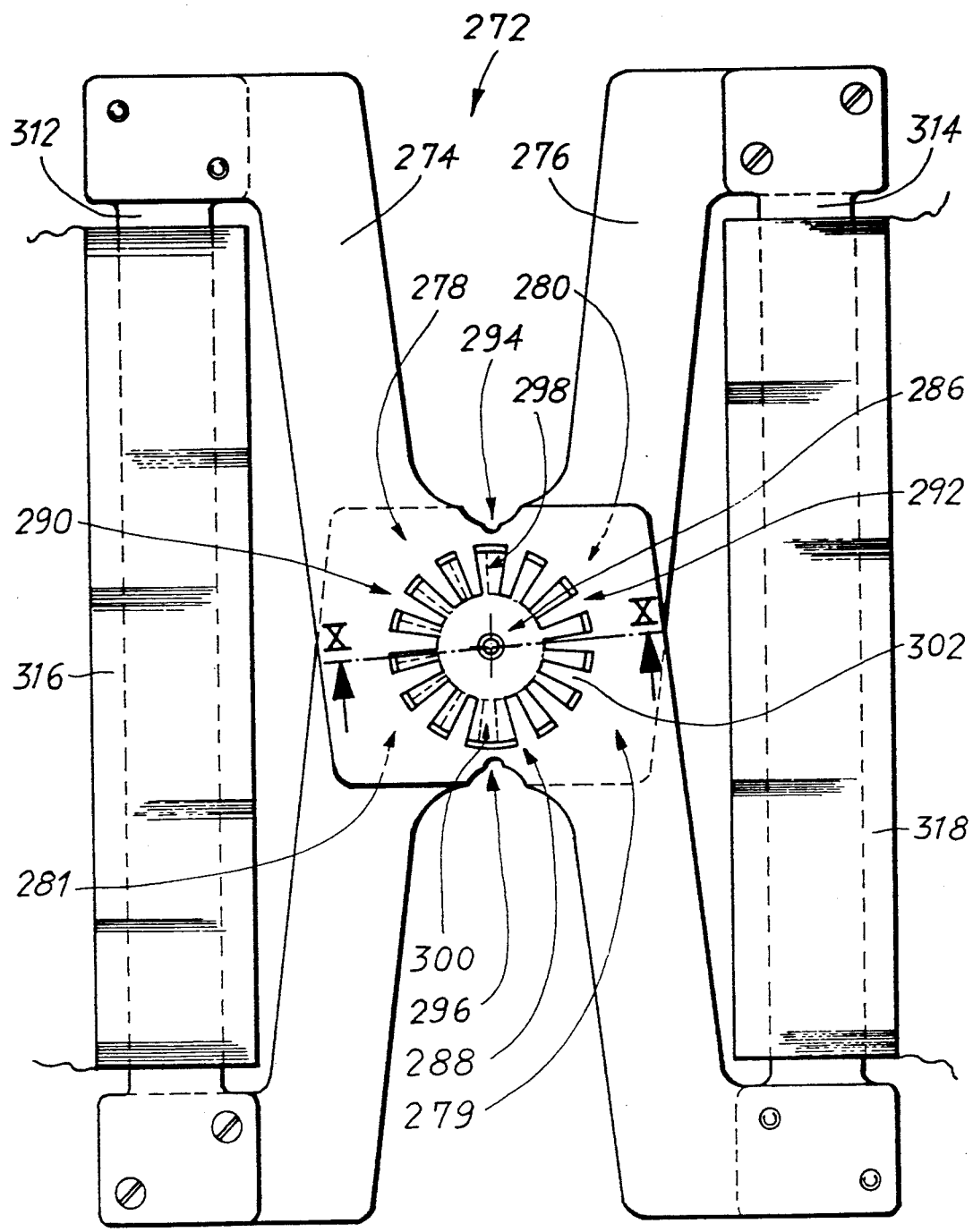
FIG. 9 shows a fourth embodiment of an electromagnetic transducer according to the invention.

Referring to FIGS. 9 and 10, there will be described hereinafter a fourth embodiment of the electromagnetic transducer according to the invention.

This electromagnetic transducer comprises a stator 272 including first and second principal stator parts 274, 276. In this embodiment the electromagnetic transducer comprises four principal magnetic poles. Effectively, the first and second principal stator parts 274, 276 respectively define first and second, then third and fourth principal magnetic poles, 278, 279 and 280, 281.

The stator 272 of this electromagnetic transducer is located basically in two parallel general planes 306 and 308, the multipolar permanent magnet 284 of the rotor being located in a general rotor plane 310 in between these two general stator planes. Again, for reasons of clarity, only the multipolar permanent magnet 284 and an axis of the rotor have been shown in FIGS. 9 and 10. In the variant of the fourth embodiment here described, the first principal stator part 274 is entirely identical to the second principal stator part 276. Each of these principal stator parts 274, 276 defines a stator hole 286 comprising a gapped circular crown 288 in its peripheral portion. Such gapped circular crown 288 is formed by two regularly gapped crowns 290, 292, the castellations of which define respectively first and second and third and fourth secondary magnetic poles. Such regularly gapped crowns 290, 292 are magnetically insulated from one another by means of isthmuses 294 and 296 located in the region of intermediate slots 298 and 300 separating the two regularly gapped crowns 290 and 292.

The respective first and fourth and second and third principal magnetic poles are magnetically coupled by means of respective first and second magnetic flux guidance legs 312, 314, each bearing a winding 316, 318.

In the variant here described, the multipolar permanent magnet comprises thirty pairs of axially oriented magnetic poles. In order to avoid leakage fields between the first and the second principal stator parts 274 and 276, the greater portion of castellations 302 of the gapped circular crown 288 projects out of the respective general planes 306, 308 of the respective principal stator parts 274, 276 in the direction of the intermediate plane 310 in which is located the multipolar permanent magnet 284, the ends of such castellations 302 defining first and second stator planes 312, 314 parallel to the general rotor plane 310.

What I claim is:

1. An electromagnetic transducer comprising:
  a stator comprising two magnetic flux guidance legs and a first principal stator part, said first principal stator part defining a first stator hole having a central region and a peripheral region surrounding said central region, the contour of said first stator hole defining within said peripheral region a first gapped circular crown located in a first stator plane and formed of castellations separated by slots; and
  a rotor having a rotation axis substantially perpendicular to said first stator plane and traversing said central region of said first stator hole, such rotor including an even number greater than two of bipolar permanent magnets each defining a pair of magnetic poles arranged on either side of a general rotor plane substantially perpendicular to said rotation axis so that the magnetic axis defined by each pair of magnetic poles has an orientation substantially parallel to said rotation axis and opposed to that of the magnetic axes defined by the adjacent pairs of magnetic poles, said pairs of magnetic poles being at least partially arranged facing at least a superposition portion of said castellations;
  first and second independently energizable windings mounted respectively on said first and second magnetic flux guidance legs; said stator further comprising a second principal stator part having a superposition portion arranged to face said pairs of magnetic poles and defining a second stator plane substantially parallel to said first stator plane, said superposition portions of said castellations and of said second principal stator part being respectively located on a first side and on a second side of said general rotor plane, said first principal stator part defining first and second principal magnetic poles and said second principal stator part defining at least one third principal magnetic pole, said first and second magnetic flux guidance legs magnetically and respectively coupling said first and second principal magnetic poles with said second principal stator part.

2. An electromagnetic transducer as set forth in claim 1, wherein at least a portion of said first gapped circular crown is arranged to face said second principal stator part.

3. An electromagnetic transducer as set forth in claim 2, wherein said bipolar permanent magnets are arranged substantially in a ring and form a multipolar permanent magnet of planar structure located in said general rotor plane, said central and peripheral regions of said first stator hole being respectively circular and annular.

4. An electromagnetic transducer as set forth in claim 1, wherein each of said bipolar permanent magnets defines an annular sector the angle ($\alpha$) at the center of which has a value substantially equal to the value of the angle at the center of the other annular sectors.

5. An electromagnetic transducer as set forth in claim 4, wherein said first gapped circular crown is basically formed by first and second regularly gapped crowns separated from one another by first and second intermediate slots, the castellations of said respective first and second regularly gapped crowns defining respective first and second secondary magnetic poles magnetically coupled to said respective first and second principal magnetic poles.

6. An electromagnetic transducer as set forth in claim 5, characterized in that two adjacent castellations of said respective first and second regularly gapped crowns are angularly separated from one another by twice said value of said angle ($\alpha$) at the center, while a castellation of said first regularly gapped crown is angularly separated relative to a castellation of said second regularly gapped crown by an angle the value of which is equal to a positive integer times said value of said angle ($\alpha$) at the center plus half the value of the said angle to the center.

7. An electromagnetic transducer as set forth in claim 1, wherein said second stator part comprises a body extended by two magnetic contact lugs.

8. An electromagnetic transducer as set forth in claim 7, wherein said body is magnetically coupled by a neck to a magnetic flux collector ring comprising said superposition portion of said second principal stator part.

9. An electromagnetic transducer as set forth in claim 7, wherein said body is magnetically coupled to an annular portion by a neck, a second gapped circular crown being provided on the outer edge of said annular portion, such second gapped circular crown and a portion of said neck comprising said superposition portion of the second principal stator part, the angular distribution of the castellations of said second gapped circular crown being substantially identical to the angular distribution of said castellations of said first gapped circular crown.

10. An electromagnetic transducer as set forth in claim 5, wherein an isthmus and a magnetic insulation gap of said first and second principal magnetic poles are provided respectively in the region of the first intermediate slot and in the region of the second intermediate slot, and a neck on the second principal stator part has no superposition portion with the first principal stator part.

11. An electromagnetic transducer as set forth in claim 3, wherein said first and second principal stator parts are entirely planar and respectively located against said first and second stator planes.

12. An electromagnetic transducer as set forth in claim 1, wherein said second principal stator part comprises a magnetic flux collector portion defining a second stator hole and comprising said superposition region of said second principal stator part.

13. An electromagnetic transducer as set forth in claim 12, wherein the contour of said second stator hole defines a second gapped circular crown, the castellations of such second gapped circular crown being basically superposed onto said castellations of said first gapped circular crown and exhibiting an angular distribution substantially identical to such latter castellations.

14. An electromagnetic transducer as set forth in claim 13, wherein said second principal stator part is basically located in a general plane, said castellations of said second gapped circular crown projecting out of such general plane in the direction of said general rotor plane.

15. An electromagnetic transducer as set forth in claim 12, wherein said second principal stator part defines a fourth principal magnetic pole, said third and fourth principal magnetic poles being magnetically coupled to said first and second magnetic flux guidance legs.

16. An electromagnetic transducer as set forth in claim 14, wherein said first and second principal stator parts are identical.

17. An electromagnetic transducer as set forth in claim 1 wherein said number of bipolar permanent magnets of said rotor is equal to thirty.

* * * * *